United States Patent
Dobbin et al.

(10) Patent No.: US 12,269,609 B2
(45) Date of Patent: Apr. 8, 2025

(54) SPARK CONTAINMENT CAP

(71) Applicant: Airbus Operations Limited, Bristol (GB)

(72) Inventors: Richard Dobbin, Bristol (GB); Matthew Cross, Bristol (GB)

(73) Assignee: Airbus Operations Limited, Bristol (GB)

( * ) Notice: Subject to any disclaimer, the term of this patent is extended or adjusted under 35 U.S.C. 154(b) by 176 days.

(21) Appl. No.: 17/851,231

(22) Filed: Jun. 28, 2022

(65) Prior Publication Data

US 2023/0002073 A1    Jan. 5, 2023

(30) Foreign Application Priority Data

Jun. 29, 2021    (GB) ..................... 2109374

(51) Int. Cl.
    *B64D 45/02*    (2006.01)
    *F16B 33/00*    (2006.01)

(52) U.S. Cl.
    CPC ............ *B64D 45/02* (2013.01); *F16B 33/004* (2013.01)

(58) Field of Classification Search
    CPC ....... B64D 45/02; B64D 37/32; F16B 33/004; F16B 37/145; F16B 37/14
    USPC ...................................................... 361/218
    See application file for complete search history.

(56) References Cited

U.S. PATENT DOCUMENTS

| | | | | |
|---|---|---|---|---|
| 2012/0219380 A1* | 8/2012 | Hutter, III | ............. | B64D 45/02 411/377 |
| 2014/0234050 A1* | 8/2014 | Asahara | ................. | B64D 45/02 411/371.1 |
| 2017/0108029 A1* | 4/2017 | Song | ...................... | B64D 37/06 |
| 2019/0061975 A1* | 2/2019 | Roper | .................... | B64D 45/02 |
| 2020/0370590 A1* | 11/2020 | Auffinger | ................ | F16B 37/14 |

FOREIGN PATENT DOCUMENTS

| | | | | |
|---|---|---|---|---|
| DE | 202012100403 U1 * | 5/2012 | ............. | F16B 37/14 |
| EP | 3446757 A1 | 2/2019 | | |
| EP | 3741682 A1 | 11/2020 | | |
| GB | 2491829 A | 12/2012 | | |
| GB | 2510131 A * | 7/2014 | ........... | B29C 65/364 |
| JP | H1061643 A | 3/1998 | | |
| JP | 2019190568 A | 10/2019 | | |
| KR | 20150143646 A * | 12/2015 | | |

OTHER PUBLICATIONS

British Search Report for Application No. 210937 dated Nov. 30, 2021.
European Office Action for Application No. 22180152 dated Apr. 24, 2024.

* cited by examiner

*Primary Examiner* — Scott Bauer
*Assistant Examiner* — Sreeya Sreevatsa
(74) *Attorney, Agent, or Firm* — KDW Firm PLLC

(57) ABSTRACT

A spark containment cap for enclosing an end of a fastener protruding from a structure, the enclosed body having a base and a cover portion, the cover portion extending from the base, the base providing an adhering surface for adhering the spark containment cap to a structure, and the base and the cover portion together forming a cavity within the enclosed body inside which the end of a fastener can be enclosed.

24 Claims, 5 Drawing Sheets

SPARK CONTAINMENT CAP

CROSS-REFERENCE TO RELATED APPLICATION

This application claims priority to GB 2109374.5 filed Jun. 29, 2021, the entire disclosure of which is incorporated by reference herein.

TECHNICAL FIELD

The disclosure herein relates to a spark containment cap. The disclosure herein also relates to a fastening system, a fastener joint, an aircraft comprising at least one of the spark containment cap, the fastening system, and the fastening joint, and also relates to a method of securing a fastener and a spark containment cap to a structure.

BACKGROUND

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightning attachment at any of the many metallic fasteners in the exterior surface, which have a much lower electrical resistance. In the wing, some of these fasteners pass through the outer wing skin into the fuel tank.

FIG. 1 is a side view of a fastener 1 passing through a panel 2, which may be a composite or metallic panel. The type of fastener shown in FIG. 1 is commonly known as a blind fastener, as it allows the fastener 1 to be fixed in place from only one side of the panel 2. The blind fastener 1 comprises a bolt 3 comprising an axially extending shaft 4, a head of the shaft 5, and a tubular sleeve 6 fitted around the shaft 4. The shaft 4 has a threaded portion on its outer circumference at one end which is the opposite end to the head of the shaft 5. The tubular sleeve 6 has a corresponding thread on its internal circumference such that the tubular sleeve 6 will travel along the shaft 4 as it is rotated. The blind fastener 1 also has a collar 7 provided around a head end 8 of the bolt 3. The collar 7 abuts the head 8 and has a flange 9 at the other end.

During installation, the fastener 1 is slid through an aperture in the panel 2 until the flange 9 has at least passed through the other side of the panel 2. The shaft 4 is then rotated to cause the tubular sleeve 6 to be drawn towards the collar 7. When the tubular sleeve 6 contacts the collar 7, the tubular sleeve 6 deforms along the flange 9, and splays outwardly forming an expanded portion on the opposing side of the panel 2 to the head of the shaft 8, therefore acting as a fastener, as shown in FIG. 1.

In the event of a lightning strike hitting the panel 2 and attaching to the fastener 1, sparking or plasma or out-gassing may occur.

With the above arrangements, the panel 2 may provide a fuel tank boundary and the fastener 1 may therefore be immersed in fuel or fuel vapor rich gas. A lightning strike at the fastener 1 may therefore provide sparking and hot gas ignition sources which could cause ignition of the fuel.

It is well known to suppress such sparking by enclosing fasteners within spark containment caps. FIG. 2 shows the fastener 1 of FIG. 1 enclosed within an example spark containment cap 20 as known in the prior art. The spark containment cap 20 is placed over the tail end of the fastener 1 that protrudes from the panel 2 and can then be fixed into place with adhesive (not shown). The adhesive can be injected into the skirt 21 through the tube 22.

Blind fasteners allow for fastening from a single side of the panel, which can greatly simplify the assembly process. However, the assembly still requires access to the rear of the panel once the fastener hole has been drilled or the fasteners have been positioned to allow for the positioning of the spark containment caps.

SUMMARY

According to a first aspect of the disclosure herein, there is provided a spark containment cap for enclosing an end of a fastener protruding from a structure; the enclosed body having a base and a cover portion; the cover portion extending from the base; the base providing an adhering surface for adhering the spark containment cap to a structure; and the base and the cover portion together defining a cavity within the enclosed body inside which the end of a fastener can be enclosed.

With such an arrangement it is possible to fix the spark containment cap in place on a structure prior to a fastener being fastened to the structure, and even before the hole for the fastener is made. As such, it is not necessary for there to be access required to a rear side of the structure after the hole is drilled and the fastener is put in place. This can enable a much quicker, simpler and more efficient assembly process.

The base may comprise a sacrificial portion into which an opening can be formed, such that the end of a fastener can be received into the cavity through the opening. As such, the hole can be formed after the spark containment cap has been fixed in place, and it eliminates any need for highly accurate alignment of the cap and a hole in the structure.

The enclosed body may be shaped substantially as a hollow conical frustum. This is a space efficient shape which is able to closely encapsulate a blind fastener, and reduces wasted space inside the structure taken up by the spark containment cap.

The base may comprise a plurality of projections on the adhering surface. As a result, the plurality of projections serve to maintain a separation distance between the base of the cap and a surface against which it is positioned, and can improve the strength of an adhesive bond between the two.

The enclosed body may be manufactured as a single piece and may be manufactured using a blow molding process. As such, the spark containment cap can be manufactured very simply, and at very low cost compared to a more traditional spark containment cap which tends to be formed as a complex injection molded part.

The enclosed body may comprise one or more alignment features. Each of the one or more alignment features may be a rib formed in the cover portion of the enclosed body, or may be a surface marking on the outside surface of the cover portion of the enclosed body. This may aid the accurate positioning of the spark containment cap on the structure, particularly if the cap is positioned prior to a hole being drilled in the structure for the fastener.

The diameter of the cap may be greater at the base than at the top of the cover.

The base may comprise an adhesive pad on the adhering surface. The adhesive pad may allow the spark containment cap to be held temporarily in place on structure while an adhesive is applied and cured, and may prevent accidental movement of the cap prior to the adhesive being cured.

The adhesive pad may be positioned over less than half of the diameter of the base of the cap. As a result, there is still enough area of the base outside of the adhesive pad to act as an adhering surface to allow for a strong enough adhesive bond between the spark containment cap and the structure.

An edge formed between the base and the cover portion may be rounded, and the rounded edge may have a first radius.

When the spark containment cap is positioned on a structure with an edge having a second radius, the first radius and the second radius may be substantially the same. As a result, the spark containment cap can be positioned close to features or components on the structure such as ribs and rib feet, which may be beneficial for the optimal positioning of the fastener, allowing for smaller, lighter fasteners, and/or fewer fasteners, which can help to save cost and weight of the assembled product.

According to a second aspect of the disclosure herein, there is provided a fastening system comprising a spark containment cap as described in the preceding statements, and a fastener, the spark containment cap being configured to receive part of the fastener.

The fastener may be a blind fastener.

The fastening system may further comprise an uncured adhesive, the adhesive being curable to fix the body to the structure.

The uncured adhesive may comprise non-deformable beads. As a result, the non-deformable beads serve to maintain a separation distance between the base of the cap and a surface against which it is positioned and can improve the strength of an adhesive bond between the two.

According to a third aspect of the disclosure herein, there is provided a fastener joint comprising: a structure; a fastener having a fastener end protruding from a surface of the structure; and a spark containment cap including: an enclosed body for enclosing the fastener end protruding from the surface of the structure; the enclosed body having a base and a cover portion; the cover portion extending from the base; the base providing an adhering surface for adhering the spark containment cap to the structure; and the base and the cover portion together forming a cavity within the enclosed body inside which the end of a fastener is enclosed; the base comprising a drilled hole through which the end of a fastener is received into the cavity; a cured sealing material provided between the base and the surface of the structure which secures the spark containment cap to the structure and seal a volume of gas within the cavity.

According to a fourth aspect of the disclosure herein, there is provided a method of securing a fastener and a spark containment cap to a structure, the method comprising: fixing a spark containment cap as disclosed herein onto a surface of the structure; forming a hole through both the structure and the base of the spark containment cap; inserting a blind fastener through the hole and tightening the fastener to secure it to the structure.

With such a method, true one-sided drilling and assembly can be achieved, with the spark containment cap being fitted to the structure prior to the drilling and assembly process. This method also reduces or even eliminates the need for access to the rear side of the structure after drilling has taken place, which can greatly simplify the assembly process, and improve the time taken to assemble.

The step of fixing the spark containment cap onto the surface of the structure may comprise applying adhesive between the base of the spark containment cap and the structure and curing the adhesive.

The step of fixing the spark containment cap onto the surface of the structure may further comprise using an adhesive pad positioned between the base of the cap and the surface of the structure to hold the spark containment cap in place while the adhesive is cured. As a result, this may prevent accidental movement of the cap prior to the adhesive being fully cured.

The step of forming a hole through both the structure and the base of the spark containment cap may comprise drilling a common hole through the structure and the base of the affixed spark containment cap. With such a method, there is no need for accurate positioning of the cap with an existing hole in the structure, greatly simplifying the assembly process and reducing the time taken.

According to a fourth aspect of the disclosure herein, there is provided an aircraft comprising at least one of a spark containment cap, a fastening system, and a fastener joint as set out in the statements above.

BRIEF DESCRIPTION OF THE DRAWINGS

Embodiments of the disclosure herein will now be described with reference to the accompanying drawings, in which.

DETAILED DESCRIPTION

Figure 3:
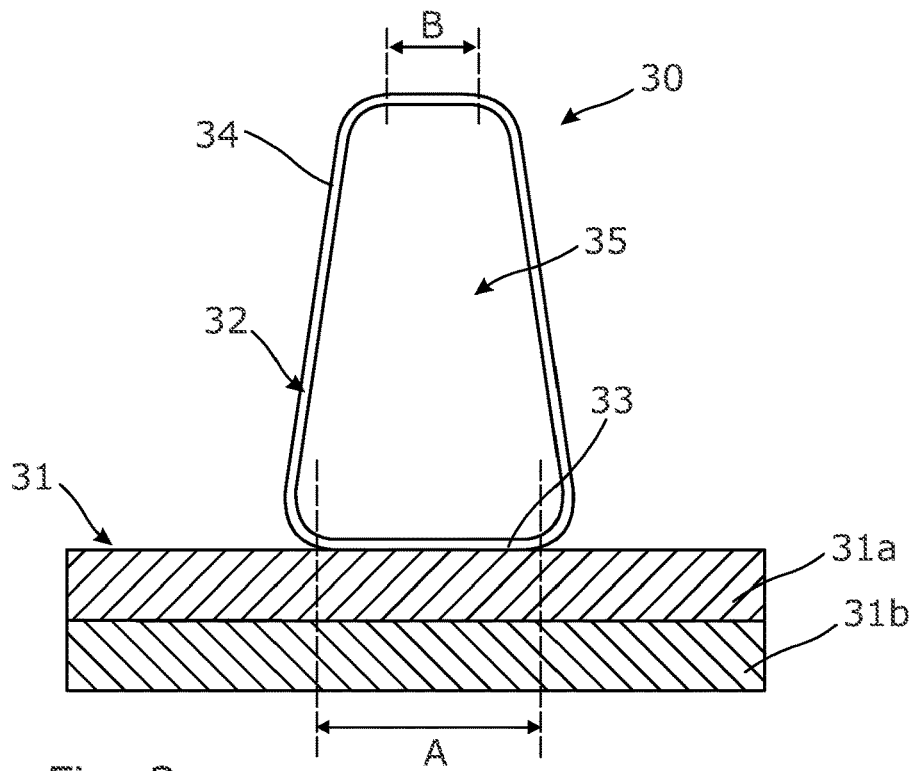
FIG. 3 is a cross-sectional side view of a spark containment cap positioned on a structure.

FIG. 3 shows a cross sectional side-view of a spark containment cap 30. The spark containment cap 30, which may be referred to herein more simply as cap 30, is shown positioned on a structure 31. The structure 31 may be, for example, an aircraft skin panel 31a joined to another component, such as another panel 31b. The structure 31 in this embodiment is a composite aircraft structural component, but may be a hybrid composite-metallic component.

The cap 30 comprises an enclosed body 32. The body 32 has a base 33 and a cover portion 34 which extends from the base 33. The base 33 provides an adhering surface that can be used for adhering the cap 30 to the structure 31, more details of which will be provided below. The base 33 and cover portion 34 together define a cavity 35 within the enclosed body 32. It is into this cavity 35 that the end of a fastener can be received, which will be described in more detail below.

Figure 2:
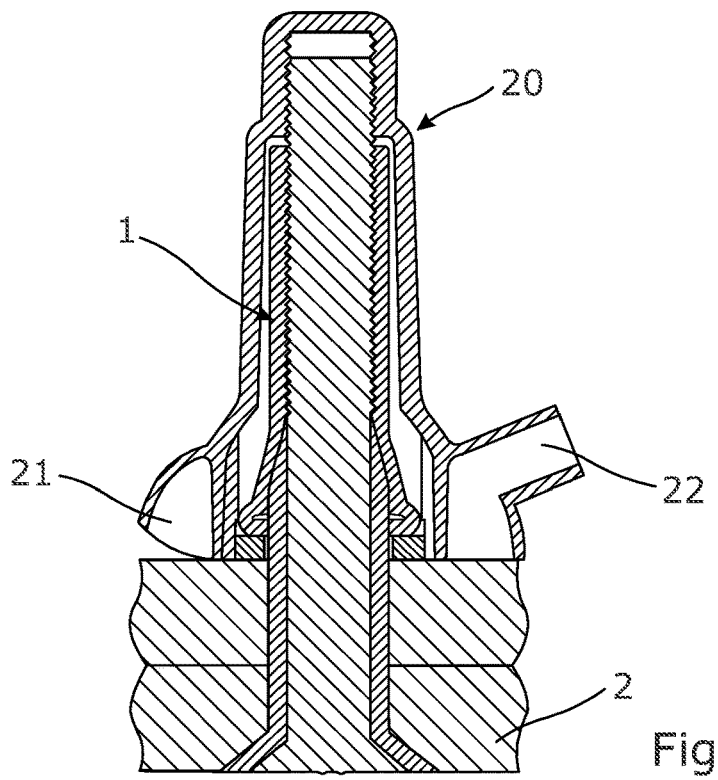
FIG. 2 is a cross-sectional side view of the prior art blind fastener joint with a spark containment cap.

The cap 30 is manufactured as a single piece, and due to its simplistic form can be manufactured by blow molding. Often, due to their complex shape, spark containment caps such as the prior art example shown in FIG. 2 are typically manufactured by injection molding. However, blow molding has lower tooling and production costs compared to injection molding, and offers a far quicker, easier and cheaper manufacturing alternative, and as such the cap 30 may be considerably cheaper than existing spark containment caps.

The cap 30 is required to be formed of a material which can be blow molded, but which is also resistant to long term exposure to fuel. Examples of such a material could be Nylon PA6, PA66 and PA12. Another example may be ULTEM™ 2300, although this material would need to be injection molded, not blow molded. These materials may require additional treatment or primer paint application to enhance adhesive properties depending on the requirements of the cap 30.

The blow molding process requires there to be a small hole in the molding to enable the injection/inflation of the plastic into the mold. This hole will preferably be provided in the base 33 of the cap 30. The reason for this will become more apparent later, but to summarise briefly this is because a portion of the base 33 is intended to be sacrificial, and a hole will be drilled through it anyway. As such, the blow molding process hole would be smaller in diameter than the subsequently drilled hole and would not have any impact on the installation or effectiveness of the spark containment cap 30.

The diameter of the cap 30 at the base 33, as indicated by double arrow A is larger than the diameter of the cap 30 at the top of the cover 34 as indicated by double arrow B. The body 32 of the cap 30 therefore substantially takes the shape of a hollow conical frustum. This frusto-conical shape allows for the insertion of the tail end of a blind fastener into the cavity 35, and also allows additional space in the cavity 35 near the base 33 for deformation of a blind fastener sleeve. The shape of the body 32 therefore is efficient with respect to the space that it takes up. As these spark containment caps 30 are often installed inside an aircraft wing, and within a fuel tank, it is important that space is not taken up unnecessarily which would reduce the effective fuel tank volume and clash with other components within the wing such as pipes. In an alternative embodiment, however, the spark containment cap could be generally cylindrical or domed in shape.

One of the biggest advantages of the cap 30 is that, as it has an enclosed body 32, it is not necessary for the cap to be accurately aligned with an existing hole in the structure 31 that is intended for a fastener. Instead, the enclosed cap 30 can be fitted and fixed to the structure 31 at a position that coincides with an intended fastening point. Steps in this method will be described with reference to FIGS. 4 through 6.

The cap 30 is slightly oversized compared to the size actually required for it to properly enclose the tail end of a fastener. This slight oversizing compensates for any error in positional accuracy of a subsequent drilling step, axial misalignment of a fastener, and/or an error in the positioning of the cap 30 itself. For example, manufacturing and assembly techniques typically give rise to errors of up to +/−1 mm in drilling and cap placement, and axial misalignment of a fastener tolerance is around +/−5 degrees.

Once the cap 30 has been placed in a desired position on the surface of the structure 31, as shown in FIG. 3, the cap 30 is then fixed to the structure using either an epoxy adhesive, shim material or polysulphide sealant. For example, the epoxy adhesive may be a two-part epoxy adhesive such as 3M™ Scotch-Weld™ Structural Epoxy Adhesive 9323 or 3M™ Scotch-Weld™ Structural Epoxy Adhesive EC-7256 B/A.

In one embodiment, an adhesive may be used that contains non-deformable beads. The non-deformable beads act to maintain a separation distance between the base 33 of the cap 30 and the surface of the structure 31. This ensures a minimum bond thickness equal to the diameter of the beads, thus strengthening the bond between the cap 30 and the structure 31. An example of such an adhesive is 3M™ Scotch-Weld™ EC-7202 B/A Epoxy Adhesive *IPS 10-04-011-04 which contains glass beads that ensure a minimum bond line thickness of 150 μm.

Figure 4:
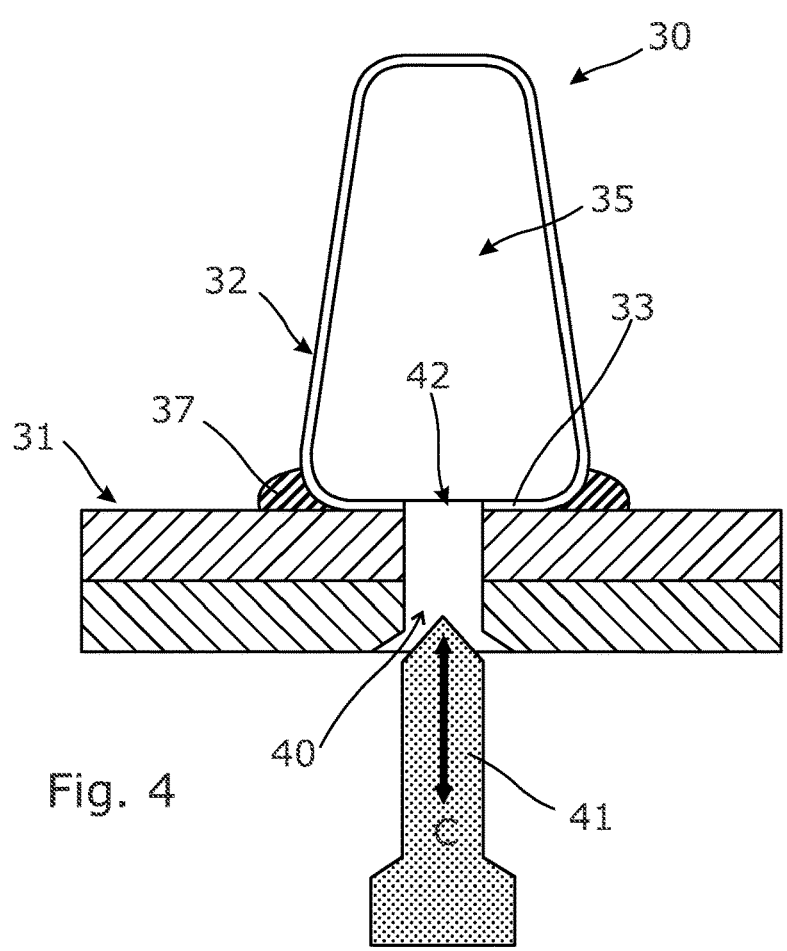
FIGS. 4, 5, and 6 show steps in a method of securing a fastener and the spark containment cap of FIG. 3 to the structure.

As described earlier, the base 33 provides an adhering surface that can be used for adhering the cap 30 to the structure 31. Adhesive is applied to the base 33 and the cap is positioned on the surface of the structure 31 and allowed to cure. Excess adhesive may form a bead 37 around the periphery of the cap as shown in FIG. 4. This bead 37 helps to strengthen the bond between the cap 30 and the structure 31, and also later acts to seal the cavity 35 inside the body 32 once a fastener is fitted in place in order to prevent escape of outgassing products. The seal between the cap 30 and the structure 31 also prevents the ingress of fuel, water or other contaminants into the cavity 35, and also prevents plasma or other out-gassing products from exiting the cavity in the event of a lightning strike.

As shown in FIG. 4, once the cap 30 is fixed to the structure 31, a hole 40 is drilled through the structure 31 through which a fastener can be inserted. A drill bit 41 is used to drill through the structure 31 at the intended fastening point position, extending through the structure and then back out again, as represented by the arrow C. The drill bit 41 is shaped such that a countersunk hole 40 is produced to correspond with the shape of the blind fastener to be used. As the cap 30 is now fixed to the rear of the structure 31 at the intended fastening point position, the drill bit also creates a hole 42 through a sacrificial portion of the base 33 of the cap 30. As such, a common hole is created through the structure and the base of the affixed spark containment cap.

Figure 1:
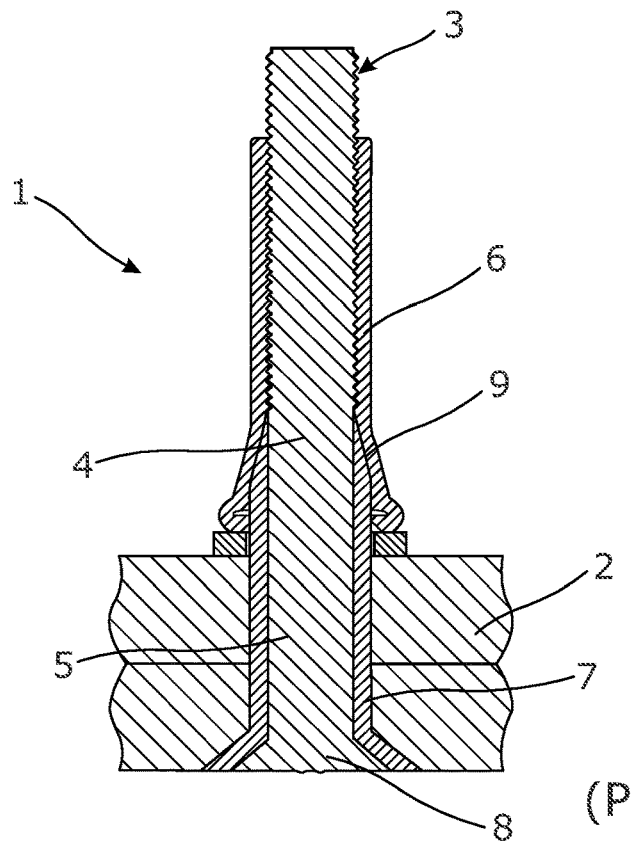
FIG. 1 is a cross-sectional side view of a prior art blind fastener joint.
Figure 5:
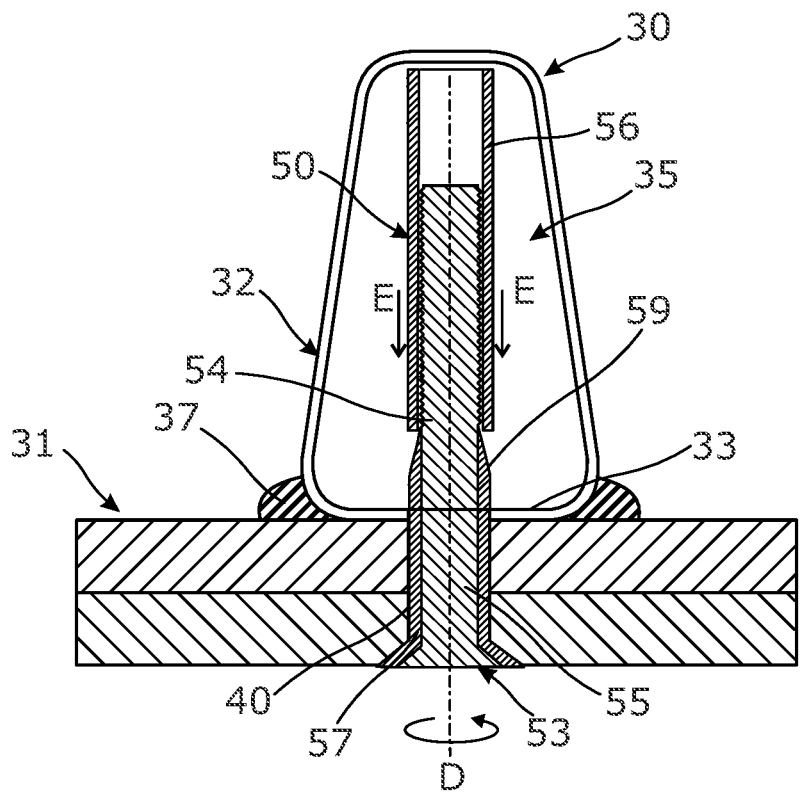

In the next step, shown in FIG. 5, a blind fastener 50 is inserted through the hole 40. The blind fastener 50 is of the same type described in relation to FIG. 1 and comprises a bolt 53 comprising an axially extending shaft 54, a head of the shaft 55, and a tubular sleeve 56 fitted around the shaft 54. The shaft 54 has a threaded portion on its outer circumference at one end which is the opposite end to the head of the shaft 55. The tubular sleeve 56 has a corresponding thread on its internal circumference such that the tubular sleeve 56 will travel along the shaft 54 as it is rotated. The blind fastener 50 also has a collar 57 provided around a head end of the bolt 53. The collar 57 abuts the head and has a flange 59 at the other end.

During installation, the blind fastener 50 is slid through the drilled hole in the structure 31 until the flange 59 has at least passed through the other side of the structure 31 and the base 33 of the spark containment cap 30. The shaft 54 is then rotated as shown by arrow D to cause the tubular sleeve 56 to be drawn towards the collar 57, indicated by arrows E. When the tubular sleeve 56 contacts the collar 57, the tubular sleeve 56 deforms along the flange 59, and splays outwardly forming an expanded portion (sometimes referred to as a bulb) on the inside of the base 33 of the cap 30.

As such it can be said that there is a fastening system provided in FIG. 5, where the fastening system comprises the spark containment cap 30 together with the blind fastener 50. The adhesive 37 that is used to fix the spark containment cap 30 to the structure also forms part of the fastening system.

Figure 6:
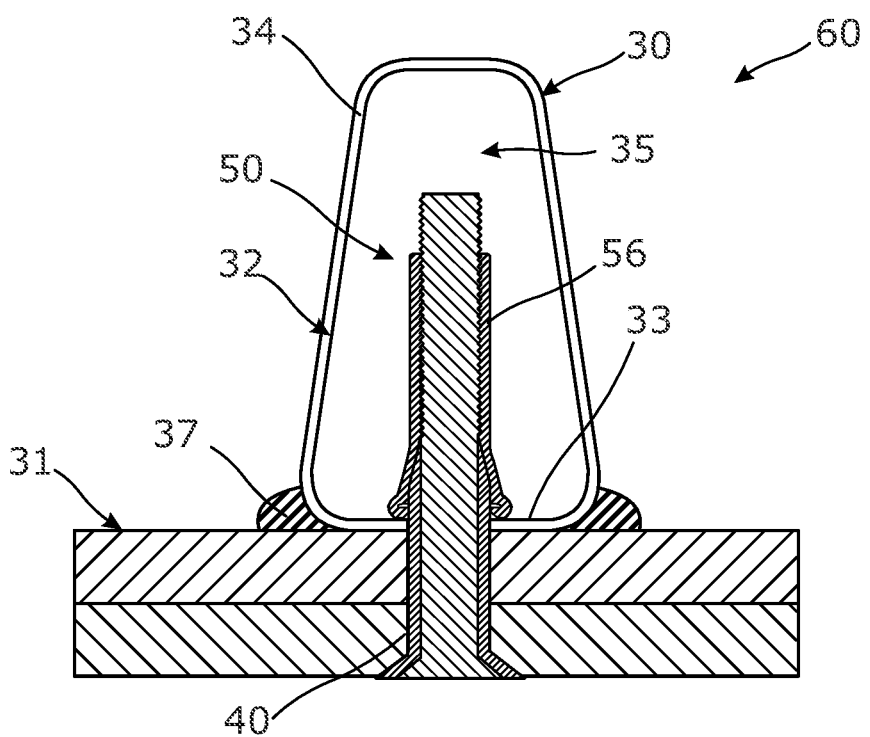

FIG. 6 shows a fastener joint 60 that is the end result once the blind fastener 50 has been fastened to the structure 31 as described above. In the completed fastener joint 60 of FIG. 6, the spark containment cap 30 is fixed to the structure 31 by a cured sealing material in the form of adhesive 37 provided between the base 30 and the surface of the structure 31. The blind fastener 50 protrudes through the hole 40 formed in the structure 31 and the base 33 of the cap 30, such that the end of the fastener is enclosed within the cavity 35 in the enclosed body 32 defined by the base 33 and the cover portion 34.

Figure 7:
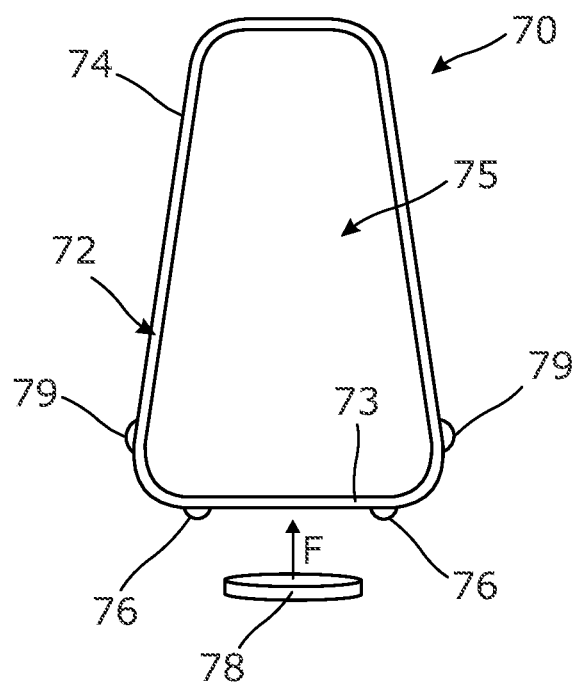
FIG. 7 is a cross-sectional side view of another embodiment of a spark containment cap.

FIG. 7 shows an alternative embodiment of a spark containment cap 70. As with the previously described cap above, the cap 70 comprises an enclosed body 72. The body 72 has a base 73 and a cover portion 74 which extends from the base 73. The base 73 provides an adhering surface that can be used for adhering the cap 70 to a structure and comprises a sacrificial portion that can be drilled to create a hole in the base 73. The base 73 and cover portion 74 together define a cavity 75 within the enclosed body 72.

The cap 70 also comprises a number of projections 76 provided on the outside surface of the base 73. The projections 76 act to maintain a defined separation distance between the base 73 of the cap 70 and a surface of a structure to which the cap is to be affixed. This provides an alternative to requiring the adhesive that contains non-deformable beads described above. Instead, the projections 76 ensure a minimum bond thickness equal to the height of the projections, thus ensuring a strong bond between the cap 70 and a structure. To provide a stable base, there are preferably at least three projections 76 provided in a spaced apart configuration on the base 73.

FIG. 7 also shows an adhesive pad 78 which can be fixed (signified by arrow F) to the adhering surface on the base 73 of the cap 70. The adhesive pad 78 is able to temporarily hold the cap 70 to a structure while the adhesive or other sealing material is curing. This reduces any risk of the cap moving or becoming dislodged before curing is complete. The size of the adhesive pad 78 allows for a satisfactory temporary hold, but without significantly affecting the effectiveness of the adhesive/sealant bond. For instance, the adhesive pad would be less than half of the diameter of the base 73 of the cap 70. Of course, it will be understood that an adhesive pad 78 may not be required if the thixotropic properties of the sealant or adhesive are sufficient to hold the cap 70 in position during curing.

Also shown in the embodiment of FIG. 7 are alignment features in the form of ribs 79 formed in the cover portion 74 of the enclosed body 72. The ribs 79 allow for sufficiently accurate positioning of the cap when positioning it onto a structure to which it is to be fixed. Some assembly methods may use robots to position and fix the cap 70 in place, and in these methods, the robot would likely have built-in positioning systems to ensure accurate placement of the cap 70 onto a structure. However, if the cap 70 is to be fitted manually, then alignment features, such as the ribs 79 can aid the person carrying out the task.

Figure 8:
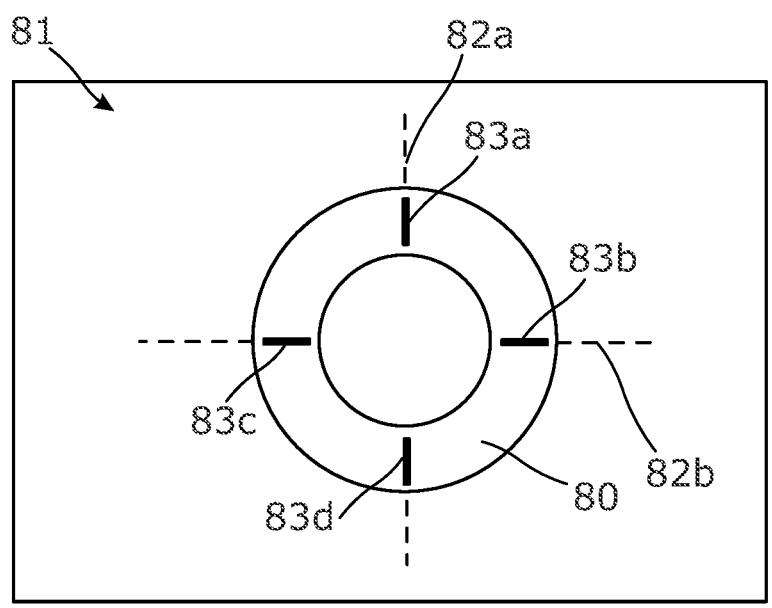
FIG. 8 is a top view of another embodiment of a spark containment cap on a structure.

Another embodiment is shown in FIG. 8 which shows a top view of a spark containment cap 80 positioned on a structure 81. The structure 81 is provided with markings shown as dotted lines 82a and 82b. The markings 82a and 82b form a target, indicating where an intended fastening point is to be where the lines 82a and 82b cross. The point at which they cross is obscured by the cap 80, but the lines extend far enough to be visible outside the outer diameter of the cap 80. The cap 80 is provided with alignment features in the form of surface markings 83a, 83b, 83c, 83d. The surface markings 83a, 83b, 83c, 83d can be aligned with the markings 82a and 82b on the structure 81 in order to position the spark containment cap 80 correctly.

Figure 9:
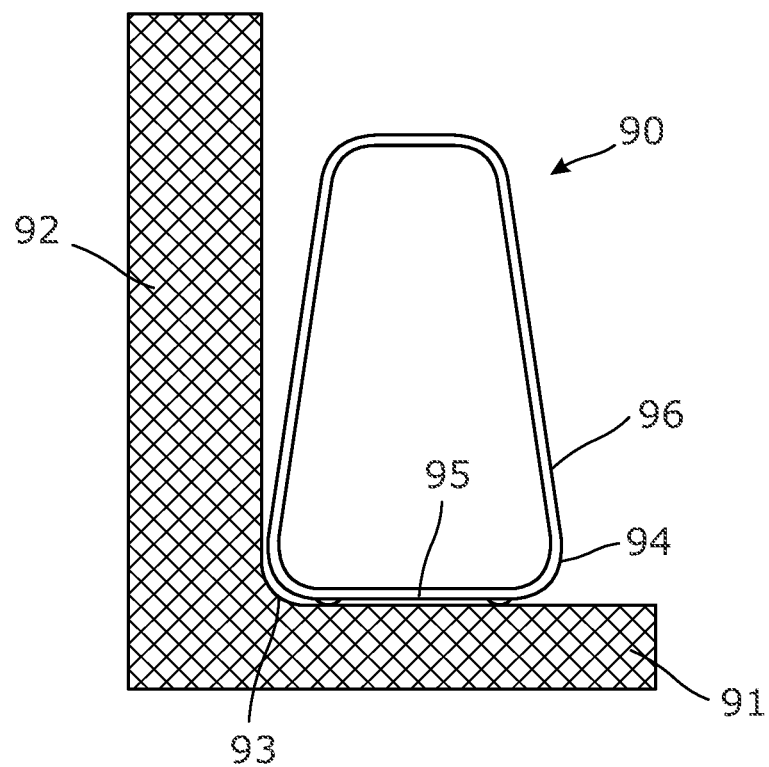
FIG. 9 is a cross-sectional side view of a spark containment cap positioned on a structure having a rib.

When used in environments such as on aircraft, it can be beneficial to install spark containment caps in close proximity to structural features such as rib fillets. By locating fasteners close to such structural features, a stronger and more reliable fastening can be achieved. As a result, smaller or fewer bolts may be necessary, which in turn can provide an optimised design that is cheaper and lighter. However, it can be challenging to fit spark containment caps close to the structural features. FIG. 9 shows how a spark containment cap 90 can be positioned on a structure 91 next to a rib fillet 92.

The edge 93 formed between the fillet 92 and the structure 91 has a natural radius. The cap 90 is manufactured such that the edge 94 formed between the base 95 and the cover portion 96 has a radius the substantially matches the radius of the edge on the structure. By matching the radius on the cap 90 with the radius on the structure 91, it is possible to fit the cap 90 as close to the fillet 92 as possible while not reducing the amount of adhesive area and bonding strength. For example, the cap may be manufactured such that the edge 94 has a radius of around 5 mm, and this will enable fitment into close proximity of a fillet on a structure having an edge of similar radius of around 5 mm.

Figure 10:
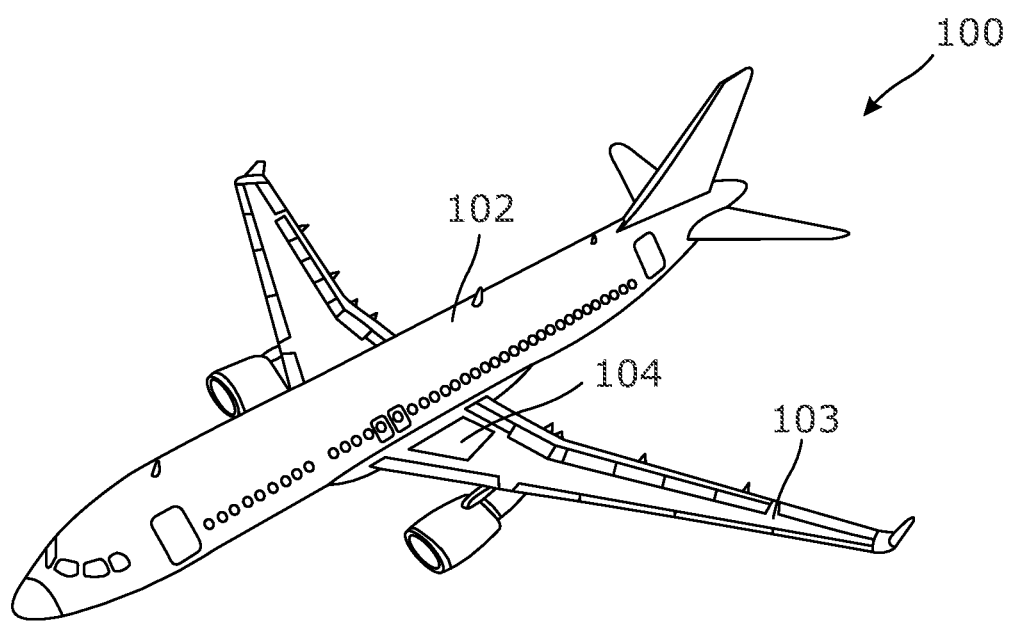
FIG. 10 is a perspective view of an aircraft.

The spark containment caps, fastening systems, fastener joints and corresponding methods of assembly may be used in any application, but most preferably the are used in an aircraft such as the aircraft 100 shown in FIG. 10. The aircraft 100 includes a fuselage 102. Two wings 103 extend from the fuselage 102. It will be appreciated that the fuselage 102 and wings 103 may take a variety of different planned formed shapes and profiles depending on the particular application. Fuel tanks 104 are formed in the fuselage 102 and wings 103. One such fuel tank 104 is schematically shown in FIG. 10. The upper and lower boundaries of the tank 104 are provided by upper and lower skins of the wing 103, and the fore and aft boundaries are provided by forward and rear spars of the wing. In the embodiments described above, the spark containment cap and the tail of the blind fastener may be located within the interior of the fuel tank 104.

Where the word 'or' appears this is to be construed to mean 'and/or' such that items referred to are not necessarily mutually exclusive and may be used in any appropriate combination.

Although the disclosure herein has been described above with reference to one or more preferred embodiments, it will be appreciated that various changes or modifications may be made without departing from the scope of the disclosure herein as defined in the appended claims.

For example, the adhesives described above which can be used to fix a spark containment cap to a structure are all two-part epoxy adhesives. However, in an alternative embodiment, an adhesive could be used which is cured using UV light. In this embodiment, it may be beneficial to form the spark containment cap from a transparent material which can allow UV curing of the adhesive through the cap.

A further alternative could provide the spark containment cap with an integrated annular skirt to provide an annular sealing volume extending around the base of the cap. This annular skirt could be arranged to receive an annular bead of the adhesive or other curable sealing material. This may be desirable if a more controlled adhesive application around the base of the cap is required. For example, the skirt could be provided with an inlet, similar to the one shown on the cap of FIG. 2, through which the adhesive is injected into the skirt.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A spark containment cap comprising:
   an enclosed body for enclosing an end of a fastener protruding from a structure;
   the enclosed body having a base and a cover portion, the cover portion extending from the base;
   the base providing an adhering surface for adhering the spark containment cap to the structure; and
   the base and the cover portion together defining a cavity enclosed by the base and the cover portion within the enclosed body prior to the fastener being installed, inside which cavity the end of the fastener can be enclosed.

2. The spark containment cap according to claim 1, wherein the base comprises a sacrificial portion into which an opening can be formed, such that the end of the fastener can be received into the cavity through the opening.

3. The spark containment cap according to claim 1, wherein the enclosed body is shaped substantially as a hollow conical frustum.

4. The spark containment cap according to claim 1, wherein the base comprises a plurality of projections on the adhering surface.

5. The spark containment cap according to claim 1, wherein the enclosed body is a single piece.

6. The spark containment cap according to claim 1, wherein the enclosed body is manufactured using a blow molding process.

7. The spark containment cap according to claim 1, wherein the enclosed body comprises one or more alignment features that aid accurate positioning of the spark containment cap on the structure.

8. The spark containment cap according to claim 7, wherein each of the one or more alignment features is a rib formed in the cover portion of the enclosed body.

9. The spark containment cap according to claim 7, wherein each of the one or more alignment features is a surface marking on an outside surface of the cover portion of the enclosed body.

10. The spark containment cap according to claim 1, wherein a diameter of the cap is greater at the base than at a top of the cover.

11. A spark containment cap according to claim 1, wherein the base comprises an adhesive pad on the adhering surface.

12. The spark containment cap according to claim 11, wherein the adhesive pad is positioned over less than half of a diameter of the base of the cap.

13. The spark containment cap according to claim 1, wherein an edge formed between the base and the cover portion is rounded, and the rounded edge has a first radius.

14. The spark containment cap according to claim 13, wherein when the spark containment cap is positioned on the structure with an edge having a second radius, the first radius and the second radius are substantially the same.

15. A fastening system comprising a spark containment cap according to claim 1, and a fastener, the spark containment cap being configured to receive part of the fastener.

16. The fastening system according to claim 15, wherein the fastener is a blind fastener.

17. The fastening system according to claim 15, further comprising uncured adhesive, the adhesive being curable to fix the body to the structure.

18. The fastening system according to claim 17, wherein the uncured adhesive comprises non-deformable beads.

19. A method of securing a fastener and a spark containment cap to a structure, the method comprising:
   fixing a spark containment cap according to claim 1 onto a surface of the structure;
   forming a hole through both the structure and the base of the spark containment cap; and
   inserting a blind fastener through the hole and tightening the fastener to secure it to the structure.

20. The method of securing the fastener and the spark containment cap to the structure according to claim 19, wherein fixing the spark containment cap onto the surface of the structure comprises applying adhesive between the base of the spark containment cap and the structure, and curing the adhesive.

21. The method of securing the fastener and the spark containment cap to the structure according to claim 20, wherein fixing the spark containment cap onto the surface of the structure further comprises using an adhesive pad positioned between the base of the cap and the surface of the structure to hold the spark containment cap in place while the adhesive is cured.

22. The method of securing the fastener and the spark containment cap to the structure according to claim 19, wherein forming a hole through both the structure and the base of the spark containment cap comprises drilling a common hole through the structure and the base of the affixed spark containment cap.

23. An aircraft comprising at least one of:
   (a) a spark containment cap of claim 1;
   (b) a fastening system comprising the spark containment cap, and a fastener, the spark containment cap being configured to receive part of the fastener; and
   (c) a fastener joint comprising:
      a structure;
      a fastener having a fastener end protruding from a surface of the structure; and
      a spark containment cap comprising:
         an enclosed body for enclosing the fastener end protruding from the surface of the structure;
         the enclosed body having a base and a cover portion, the cover portion extending from the base;
         the base providing an adhering surface for adhering the spark containment cap to the structure;
         the base and the cover portion together forming a cavity enclosed by the base and the cover portion within the enclosed body prior to the fastener being installed, inside which cavity the fastener end is enclosed; and
         the base comprising a drilled hole through which the fastener end is received into the cavity;
         a cured sealing material provided between the base and the surface of the structure which secures the spark containment cap to the structure and seals a volume of gas within the cavity.

24. A fastener joint comprising:
a structure;
a fastener having a fastener end protruding from a surface of the structure; and
a spark containment cap comprising:
- an enclosed body for enclosing the fastener end protruding from the surface of the structure;
- the enclosed body having a base and a cover portion, the cover portion extending from the base;
- the base providing an adhering surface for adhering the spark containment cap to the structure;
- the base and the cover portion together forming a cavity enclosed by the base and the cover portion within the enclosed body prior to the fastener being installed, inside which cavity the fastener end is enclosed; and
- the base comprising a drilled hole through which the fastener end is received into the cavity;
a cured sealing material provided between the base and the surface of the structure which secures the spark containment cap to the structure and seals a volume of gas within the cavity.

* * * * *